(No Model.)

R. MATTESON & A. M. BROWN.
JOURNAL BOX.

No. 269,592. Patented Dec. 26, 1882.

WITNESSES
Wm. T. Coop.
C. H. Leuther Jr.

INVENTOR
Richard Matteson
Alfred M. Brown
by Joseph A. Miller & Co.
Attys

UNITED STATES PATENT OFFICE.

RICHARD MATTESON AND ALFRED M. BROWN, OF PAWTUCKET, R. I.

JOURNAL-BOX.

SPECIFICATION forming part of Letters Patent No. 269,592, dated December 26, 1882.

Application filed November 13, 1882. (No model.)

*To all whom it may concern:*

Be it known that we, RICHARD MATTESON and ALFRED M. BROWN, both of Pawtucket, in the county of Providence and State of Rhode Island, have invented a new and useful Improvement in Journal-Boxes; and we hereby declare that the following is a full, clear, and exact description of the same, reference being had to the accompanying drawings, forming part of this specification.

This invention has reference to an improvement in the construction of bearings for shafts by which power is conveyed, and in the lubrication of such bearings.

The object of the invention is to automatically lubricate the bearing, prevent waste of oil, protect the oil and bearing surfaces, and indicate the amount of oil in the box without opening the same.

The invention consists in the peculiar construction of the journal-box and novel construction of the lubricating devices, all of which will be more fully set forth hereinafter, and pointed out in the claims.

Figure 1:
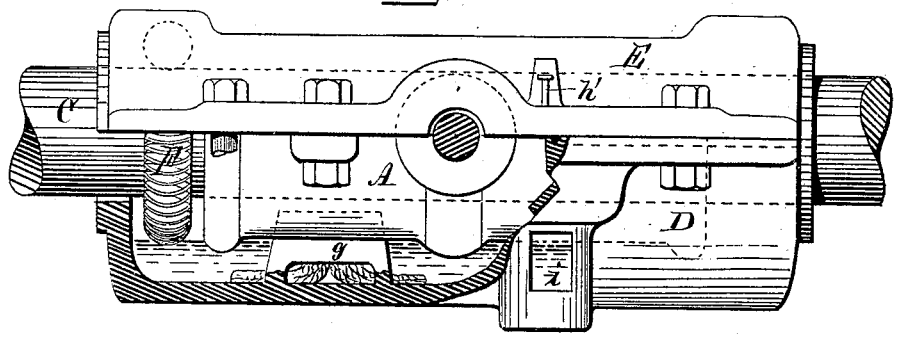
Figure 2:
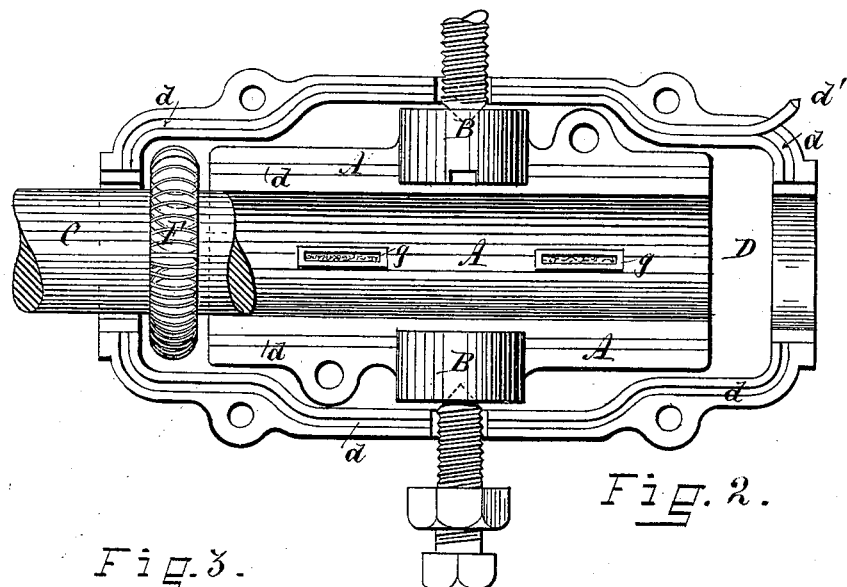
Figure 3:
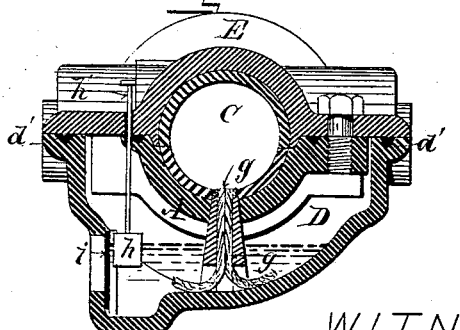

Figure 1 is a side view of our improved journal-box, shown partly in section. Fig. 2 is a top view of the lower part of our improved journal-box, showing a short piece of the shaft at one end provided with a collar made of spiral wire. Fig. 3 is a sectional view of the journal-box, showing the lubricating device and the indicator.

In the drawings, A is the bearing for the shaft, supported by the two gimbal-bearings, B B, in which it can adjust itself to the shaft. C is the shaft. D is an oil-reservoir inclosing the bearing A, and E is the cover forming the upper half of the bearing A, and, extending over the oil-reservoir D, forms the cover to the same. For the purpose of protecting the oil from air and dust, the joint between the oil-chamber D and cover E is made air and dust tight by forming the grooves $d\ d$ and placing a packing cord or strip, $d'$, into the same. When, now, the cover is screwed down a tight joint is produced.

Rapidly-revolving shafts or axles are liable to throw oil from the boxes by carrying the oil laterally along the shaft, and particularly so when a pulley or wheel is placed close to the journal-box. To prevent the oil from following the shaft or axle, we form a ring or collar of a length of spirally-coiled wire and place the same on the shaft within the oil-chamber D, which at this point is sufficiently enlarged to allow the spiral-wire collar F to revolve with the shaft, one of these collars being placed at each end of the oil-chamber. The advantages of a collar made of a spiral-wire spring over other collars are, among others, that the wire-spring collar can be readily secured to a shaft by cutting a length of coiled-wire spring sufficient to lap the ends over each other, stretch the same around the shaft, and interlock the ends, when the tension of the spring will retain the collar, so that it will turn with the shaft. Such a collar, formed of a spiral-wire spring, presents a much larger surface, on which the oil from the revolving shaft will flow outward until it is thrown off into the oil-reservoir. Such a collar is much cheaper than a metal collar; it adheres much better to the shaft than a leather collar; it is much more durable, requires no fitting, and can be quickly removed and replaced.

$g\ g$ are oil-ducts extending from the oil-reservoir through the bearing A to the shaft. They are filled with wicking and supply the shaft with lubricating-oil by capillary attraction.

$h$ is a float, provided with the stem $h'$, which extends through the cover and projects beyond the same, so as to indicate the height of the oil in the reservoir.

A glass plate, $i$, may be placed into any convenient part of the reservoir, so that the oil can be seen and the reservoir refilled when required.

This improved journal-box, while it freely adjusts itself to the shaft, maintains a perfect lubrication of the parts in contact, thereby reducing friction. No oil is wasted or lost, and no dust can enter the same.

Having thus described our invention, we claim as new and desire to secure by Letters Patent—

1. In a journal box, the combination, with the shaft or axle, of the collar F, made of a spirally-wound metal spring constructed to throw surplus oil from the shaft or axle, as described.

2. The combination, with the bearing-bolster A and the oil-reservoir D, provided with the oil-ducts $g\ g$, of the cover E, extending over the shaft and over the oil-reservoir, and secured by means of the packing $d'$, placed into the groove $d$, so as to make a tight joint, as described.

3. The combination, with the journal-bearing, the oil-reservoir D, and cover E, of the float $h$, provided with the stem $h'$, extending above the cover, as and for the purpose set forth.

4. In a journal-box, the combination, with the shaft or axle and its bolster, of an oil-reservoir provided with the oil-ducts $g\ g$, and the collar or collars F, formed of spirally-wound wire, as described, so as to return any excess of oil to the reservoir and prevent waste, as described.

RICHARD MATTESON.
ALFRED M. BROWN.

Witnesses:
M. F. BLIGH,
J. A. MILLER, Jr.